(12) United States Patent
Mouritsen

(10) Patent No.: US 9,235,761 B2
(45) Date of Patent: Jan. 12, 2016

(54) ZERO PHASE REAL TIME FILTERING WITH A RECURRENCE MATRIX

(75) Inventor: Stephen K. Mouritsen, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 1261 days.

(21) Appl. No.: 12/948,719

(22) Filed: Nov. 17, 2010

(65) Prior Publication Data

US 2012/0123740 A1     May 17, 2012

(51) Int. Cl.
*H03F 1/26*     (2006.01)
*G06K 9/00*     (2006.01)

(52) U.S. Cl.
CPC .......... *G06K 9/00557* (2013.01); *G06K 9/0051* (2013.01)

(58) Field of Classification Search
CPC ................... G06F 17/30035; G06F 17/30442; G06F 17/3053; G06F 17/30554; H04L 12/28; G08G 1/0104

USPC .............. 703/2; 702/33, 184, 189; 700/29–31
See application file for complete search history.

(56) References Cited

U.S. PATENT DOCUMENTS

| | | | |
|---|---|---|---|
| 6,810,124 B1 | 10/2004 | White | |
| 8,013,789 B2 * | 9/2011 | van Graas et al. | 342/357.46 |
| 2004/0128083 A1 | 7/2004 | Wang et al. | |
| 2005/0096873 A1 | 5/2005 | Klein | |
| 2007/0078529 A1 | 4/2007 | Thiele et al. | |
| 2009/0105998 A1 | 4/2009 | Radibratovic et al. | |
| 2011/0238390 A1 * | 9/2011 | Krebs et al. | 703/2 |

OTHER PUBLICATIONS

Smith, "The Scientist and Engineer's Guide to Digital Signal Processing," DSP Guide, Analog Digital, 1997-2011, pp. 328-332.*
Sutherland et al., 'Recursive Total Least Squares: An alternative to the discrete Kalman Filter', Sep. 2, 2006, University of Minnesota, Computer Science Department, pp. 1-17.*

* cited by examiner

*Primary Examiner* — Elias Desta
(74) *Attorney, Agent, or Firm* — Hugh P. Gortler

(57) ABSTRACT

Processing of a signal includes identifying a past recurring pattern in the signal with a recurrence matrix, and filtering the signal and the recurring pattern such that the recurring pattern serves as a representation of future signal behavior.

24 Claims, 9 Drawing Sheets

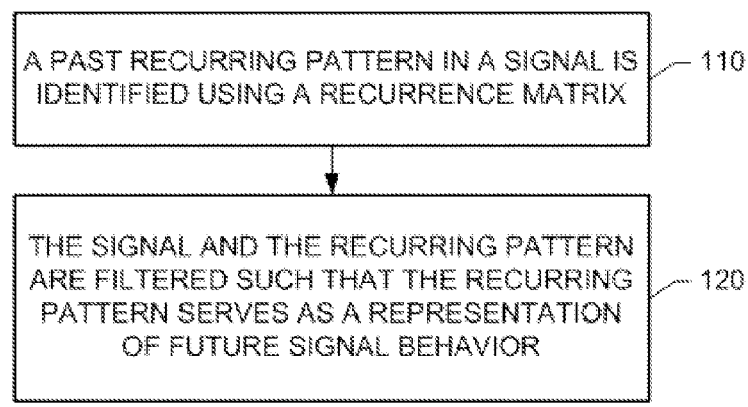
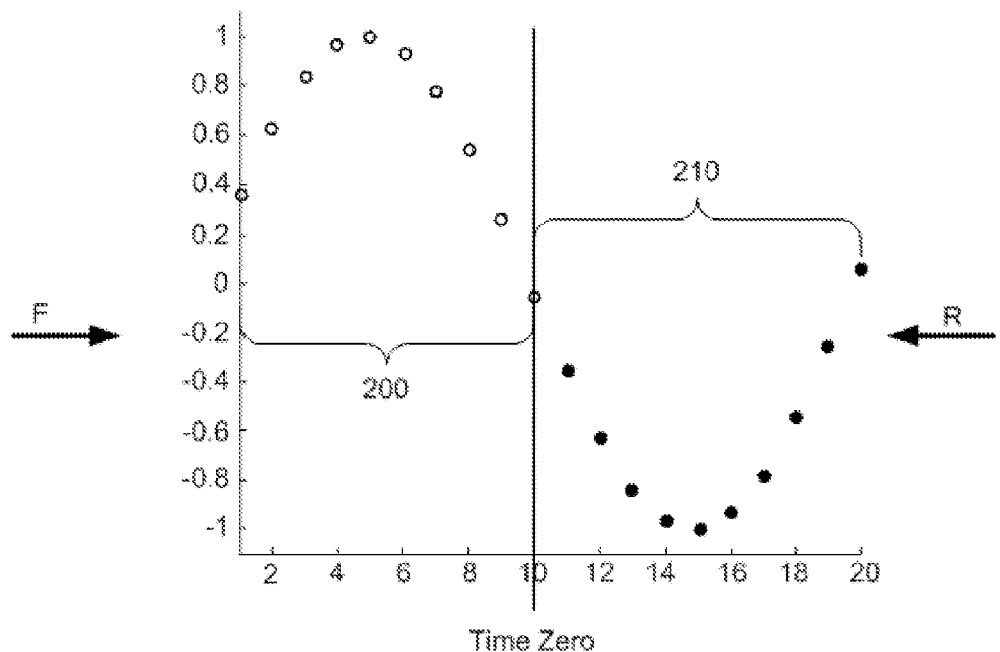

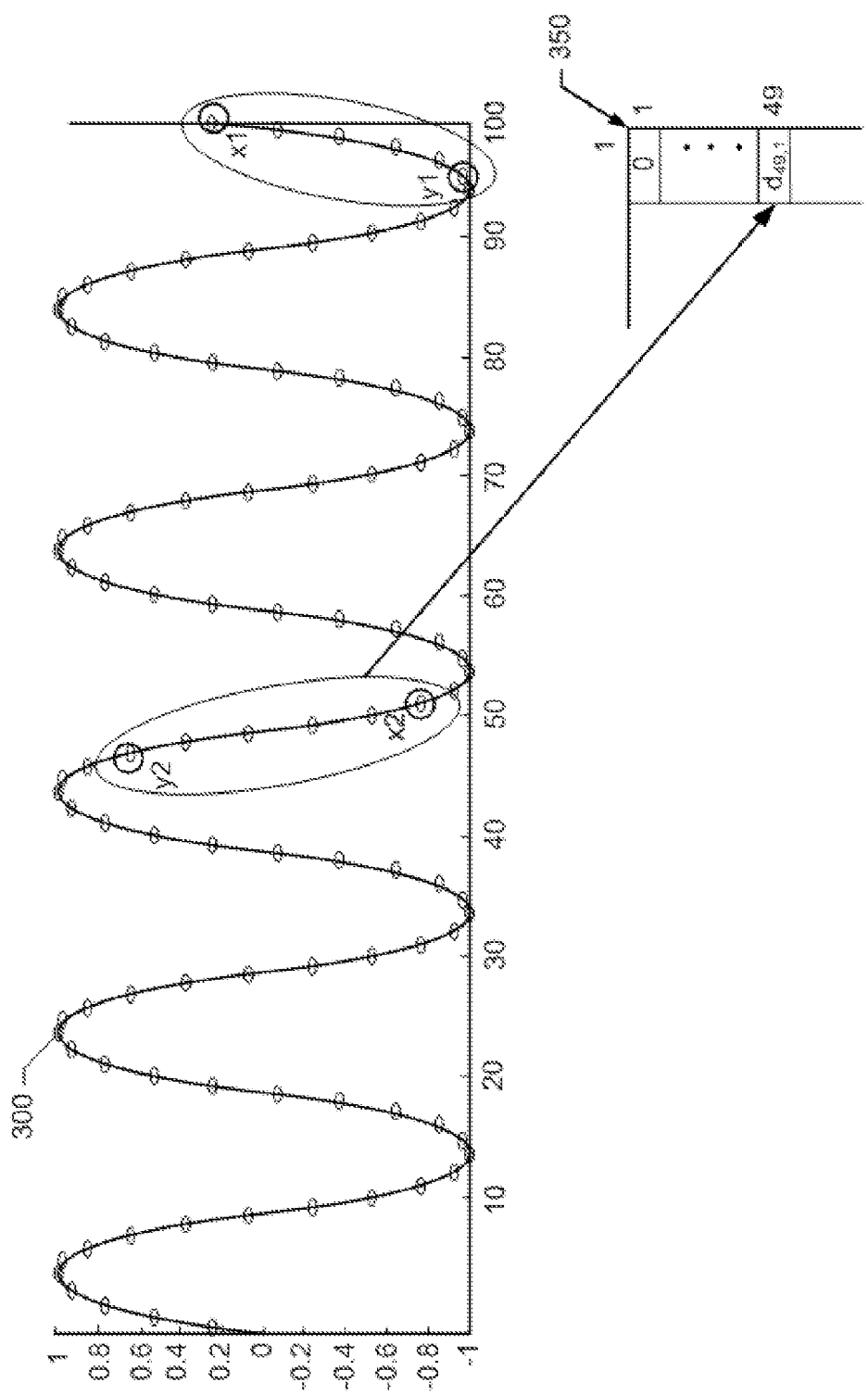

ZERO PHASE REAL TIME FILTERING WITH A RECURRENCE MATRIX

BACKGROUND

Zero phase filtering can be performed by applying a digital recursive filter to an input signal in both forward and reverse directions, and combining the results to produce an output signal. The square root of the output signal is equal to the magnitude, and the phase of the output signal cancels to zero. Thus, the output signal has precisely zero lag. However, this bidirectional filtering technique does not produce a zero phase response in real time because it lacks future signal behavior.

A zero phase response in real time would be desirable.

SUMMARY

According to an embodiment herein, a method of processing a signal includes using a processor to identify a past recurring pattern in the signal with a recurrence matrix; and filter the signal and the recurring pattern such that the recurring pattern serves as a representation of future signal behavior.

According to another embodiment, an apparatus includes a pre-processing component and a filtering component. The pre-processing component de-trends an input signal. The filtering component generates a recurrence matrix from the de-trended signal, identifies a past recurring pattern using the recurrence matrix, and filters the de-trended signal and the recurring pattern such that the recurring pattern serves as a future extension of the de-trended signal.

According to another embodiment, a flight control system comprises a flight control computer, sensors configured to capture sensory signals, and a filtering module for filtering the sensory signals in real time with zero phase lag. The flight control computer acts upon the filtered sensory signals. The filtering of a sensory signal includes identifying a past recurring pattern in the sensory signal with a recurrence matrix, and filtering the sensory signal and the recurring pattern such that the recurring pattern serves as a representation of future signal behavior.

BRIEF DESCRIPTION OF THE DRAWINGS

FIG. 1 is an illustration of a method of processing a signal.

FIG. 2 is an illustration of a recurring pattern that is attached to a signal.

FIG. 3 is an illustration of how an input signal is used to construct a recurrence matrix.

FIG. 4b is an illustration of a recurring pattern that is attached to the signal of FIG. 3, the recurring pattern having been identified by the contour plot of FIG. 4a.

DETAILED DESCRIPTION

Figure 4A:
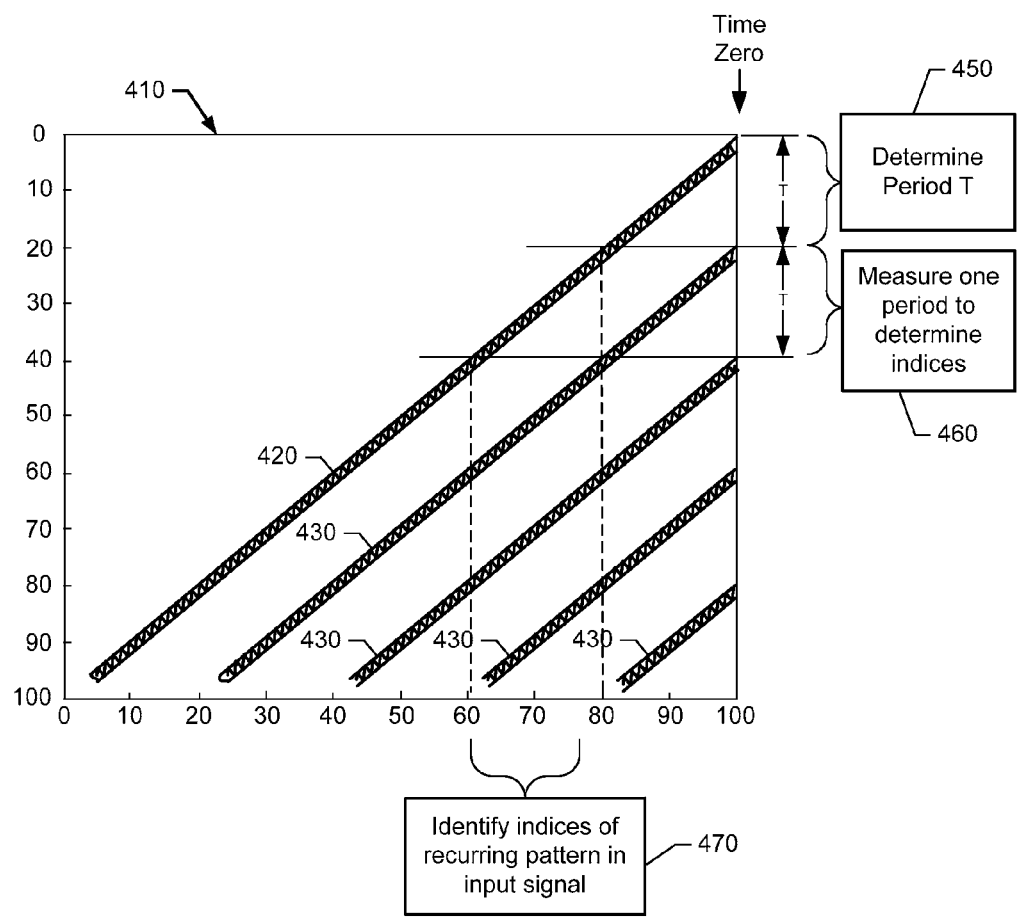
FIG. 4a is an illustration of contour plot of a recurrence matrix.

Reference is made to FIG. 1, which illustrates a method of processing a digital input signal. At block 110, a past recurring pattern in the input signal is identified with a recurrence matrix. A recurrence matrix is an extension of the well-known "autocorrelation" method from statistics, but with signal time history retained. Each sample of a signal time history can be referenced by its index number. The largest index number refers to the current time (time zero). The past recurring pattern may be identified as follows: the recurrence matrix is constructed from an input signal, a recurring pattern is identified in the recurrence matrix, and indices of the recurring pattern are determined. Those indices point to samples that constitute a recurring pattern in the input signal.

At block 120, the signal and the recurring pattern are filtered such that the recurring pattern serves as a representation of future signal behavior. For example, the recurring pattern is attached to a front of the input signal to serve as a representation of future signal behavior, and the combined input signal and recurring pattern are filtered by a digital recursive filter in both forward and reverse directions. Results of the forward and reverse filtering are combined to produce an output signal having zero lag. The filtering is performed in real time.

Reference is made to FIG. 2, which illustrates a recurring pattern 210 attached to the front of the signal 200 at time zero. Samples of the input signal are represented by open circles. Samples of the recurring pattern are represented by filled circles. The filtering is performed in forward and reverse directions as indicated by the arrows F and R.

Although FIG. 2 illustrates a sinusoidal signal, a method herein is not limited to the processing of a signal having a sinusoidal shape. The processing can be performed on signals having a sawtooth, square wave or any arbitrary shape that is recurring.

Reference is now made to FIG. 3, which illustrates an input signal 300 consisting of 100 samples. The input signal 300 has a period of 20 samples.

A recurrence matrix 350 may be constructed using first and second sets of vectors (x1, y1) and (x2, y2) that are moved systematically through the input signal 300. Each time the first set (x1, y1) or second vector (x2, y2) is moved, a distance is computed. For example, a Euclidean distance may be computed as $d=\sqrt{(x1-x2)^2+(y1-y2)^2}$. Other relationships between two vectors may be used.

For the example illustrated in FIG. 3, the embedded dimension is two. An embedded dimension of two means that the input signal 300 is represented in two dimensions. Since the input signal 300 is 100 samples long, the recurrence matrix 350 is created with a size of 100×100 (only the rightmost column in this recurrence matrix 350 is illustrated).

For the example illustrated in FIG. 3, the time delay is five. Time delay refers to the time between the x and y points in a vector. In the example of FIG. 3, the time delay of five units is one-quarter of the signal period. If a state space reconstruction plot is constructed (see FIG. 6), an optimum time delay should be chosen. If the time delay is too small or zero, then the reconstruction plot collapses to a straight line, yielding no information. If too large a time delay is chosen, then the vectors (x1,y1) and (x2,y2) become too independent and the underlying structure (related to the recurring signal shape) is lost and the plot becomes unusable. The optimum time delay, however, is just large enough to expand the plot and maximize the vector dependencies. For the example of a sinusoidal type of signal, the optimum time delay is one-quarter of the period, leading to a circular path around the origin (see FIG. 8). Therefore the rule of thumb for time delay is one-quarter period subject to tweaking if the signal shape is non-sinusoidal.

The recurrence matrix may be filled as follows. A systematic scan of the input signal 300 is performed. The first point of the scan corresponds to the upper right corner of the recurrence matrix, which represents time zero. The points x1 and x2 are coincident on the $100^{th}$ point. The points y1 and y2 are coincident on the $95^{th}$ point (the $95^{th}$ point is a result of a time delay of five). Then for the sets (x1, y1) and (x2, y2), a distance d is computed as $d=\sqrt{(x1-x2)^2+(y1-y2)^2}$. The distance is d=0, because x1=x2 and y1=y2. A value of zero is placed in the upper right hand corner of the recurrence matrix 350. This zero value will ultimately lead to the main diagonal, which is equal to zero regardless of the signal behavior. A zero main diagonal is a property of all recurrence plots.

After the first entry in the recurrence matrix is computed, the second vector (x2, y2) is moved one sample into the past, and the first vector (x1 and y1) is not moved. A distance d will have a non-zero value. This value is placed in the next matrix location just below the upper right hand corner. As the search progresses, the rightmost column in the recurrence matrix 350 is filled with values for distance d. The distance d is computed each time the vector (x2,y2) is successively moved, and the computed distance is placed in the rightmost column of the recurrence matrix 350. Thus, the vector (x2,y2) is moved 100 times into the past until there is no more signal, whereby the rightmost column is filled.

When the vector (x2,y2) is located in identical pattern locations, then d=0. This means that the rightmost column, will periodically have a zero entry. These zeros represent the beginnings of diagonals, which will grow as the process is repeated for the next to last rightmost column.

When computing the next-to-last column, the first vector (x1, y1) is moved one sample into the past and held there while the second vector (x2, y2) is successively moved backwards into the past. When all matrix locations are filled with a value for "d", the recurrence matrix 350 is complete. Every "d" is indexed by its location in the matrix by a row and column.

This example uses a step size of one sample. However, a method herein is not so limited. A different step size may be used so long as it is used consistently.

A recurrence matrix, when plotted as a contour, is also known as a recurrence plot. A recurrence plot provides a visual aid for understanding the recurring behavior. In the contour plot, recurring behavior is easily seen as diagonals. The nature of the diagonals provides information regarding the quality of the recurrence. For example, straight, clean diagonals represent more or less ideal recurring behavior. On the other hand, ragged, broken diagonals represent only sporadic recurring behavior.

Reference is now made to FIG. 4a, which illustrates a contour plot 410 of the recurrence matrix 350 (the recurrence matrix 350, in turn, was generated from the input signal 300). The contour plot 410 includes a main diagonal 420, which represents the input signal. The main diagonal 420 represents a correlation of the signal with itself. Since the distance d of the signal from itself is zero, every recurrence plot regardless of the nature of the signal, has a zero main diagonal 420.

Since the input signal 300 is recurring, the contour plot 410 also includes off-diagonals 430. The off-diagonals 430 represent recurring behavior of the input signal 300.

FIG. 4a also visualizes how a recurring pattern in the input signal 300 is identified. (In practice, the recurrence matrix 350 is used to find the recurring pattern.) At block 450, the period T is determined as the distance between the main diagonal 420 and the first off-diagonal 430. At block 460, one period T of the first off-diagonal 430 is measured. The corresponding portion of the input signal contains the recurring pattern. At block 470, indices of the recurring pattern are identified. These indices locate precisely the recurring pattern of the input signal 300. In FIG. 4a, these indices correspond to samples 61 to 80 of the input signal. Thus, samples 61 to 80 of the input signal contains a recurring pattern.

Figure 4B:
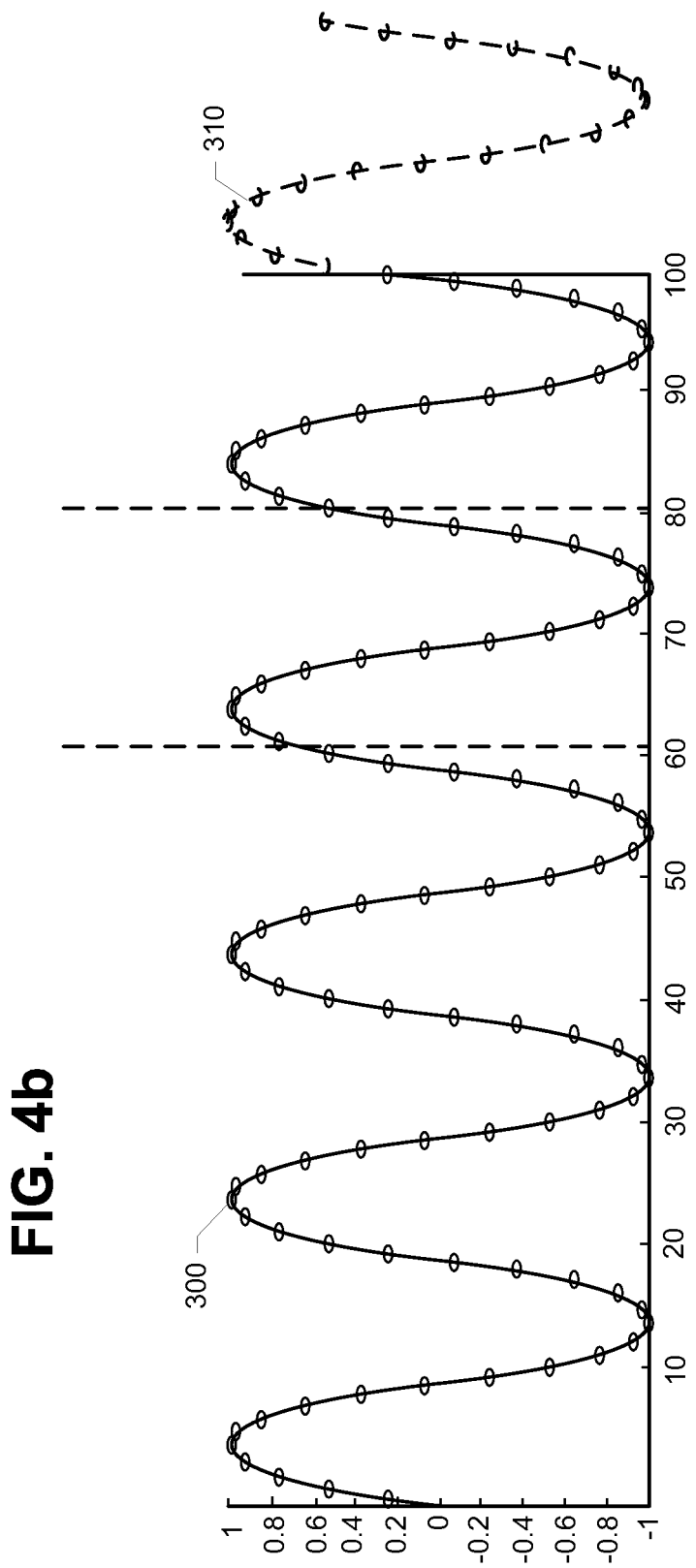

Additional reference is made to FIG. 4b. The input signal 300 is shown in solid, and the recurring pattern is shown between the dash vertical lines. Samples 61 to 80 of the input signal are copied, and the copied portion 310 is attached to the front of the input signal 300. The length of the copied portion 310 is one period. The attached portion 300 (shown in dash) and the input signal 300 are supplied to a recursive filter, which performs filtering in forward and reverse directions. Results of the forward and reverse filtering are combined to produce a zero phase real time response.

Should the input signal become non-recurring (e.g., the input signal is random or transitory), the off-diagonals 430 will disappear, whereby only the input signal, without an extension, will be supplied to the recursive filter. Thus, at least a minimum, conventional, filtering capability is maintained. If the off-diagonals 430 reappear, a copy the recurring pattern is reattached to the front of the input signal 300, and both the attached portion 310 and the input signal 300 are filtered.

The minimum number of samples needed to identify a recurring pattern can be as few as two, which is near the theoretical fidelity limit, the Nyquist frequency. In practice, however, fidelity breaks down even earlier if the number of samples per wavelength drops below about four samples per wavelength.

Filtering herein may be performed as soon as sufficient signal is available to generate a recurrence matrix. The input signal length should be at least one recurring wavelength (one period), and, at least one diagonal should be recognizable. Consequently, before the zero phase filtering can begin, a finite amount of time will elapse. Until then, basic signal attenuation remains the same with or without zero phase lag. Until the first wavelength (or so) suddenly appears, the input signal will be filtered with a conventional filter (with phase lag) and the amplitudes will be attenuated in a conventional manner.

In some embodiments, conventional filtering is performed until the input signal exhibits recurring behavior and the sufficient signal is available to generate a recurrence matrix. Then zero phase real time filtering is performed. In other embodiments, signal filtering is not performed until a quality match is made between past signal behavior and the current signal. Only then is the past recurring signal extracted and real time filtering engaged.

The recurrence matrix may be updated every frame. One frame is one computational cycle, which means that the recurrence matrix may be updated every sample.

Figure 5:
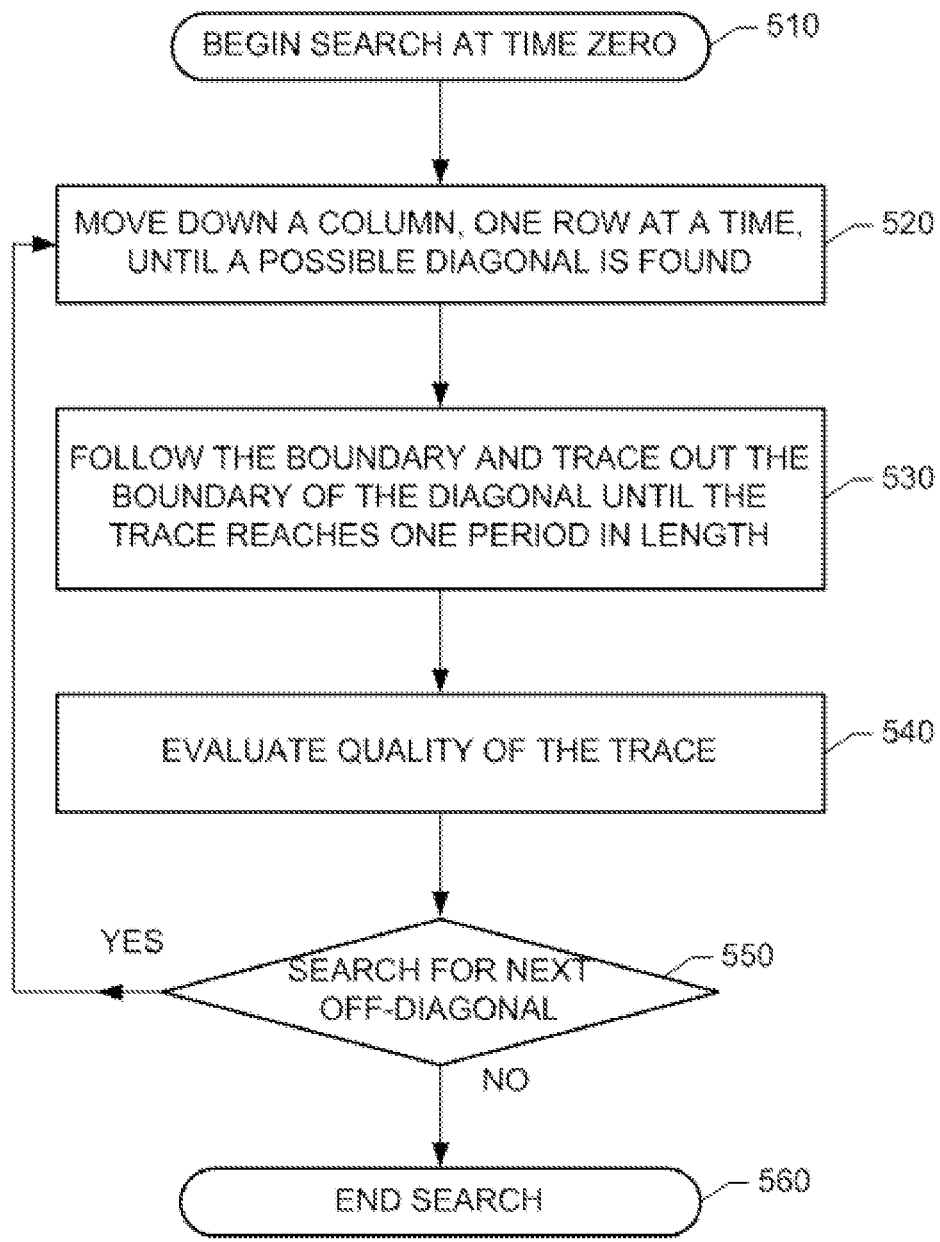
FIG. 5 is an illustration of a method for identifying a recurring pattern in a recurrence matrix.

Reference is now made to FIG. 5, which illustrates a method of identifying a recurring pattern in a recurrence matrix. The recurrence matrix is systematically searched for a diagonal pattern. The search begins in the upper right hand corner of the recurrence matrix, which corresponds to time zero (block 510). The search moves down the rightmost column, one row at a time, until a possible diagonal is found (block 520). For instance, if d<1 (where 1 is the default value of the recurrence matrix), a possible diagonal is found.

The search follows the boundary and traces out the boundary of the diagonal until the trace reaches one period in length (block 530). The period is computed from the distance from time zero to the first diagonal.

The quality of the trace may then be evaluated (block 540). For an ideal input signal, all diagonals will be represented by d=0 values. In practice, however, the input signal will contain noise, it might vary in frequency, signal shape might suddenly change, etc. The mapped out diagonal results in a cluster of points. Recurrence quality can be judged from this cluster. If the cluster is narrow, straight and smooth, then the recurrence is high quality. A least squares line may be passed through the points and it is possible to describe its narrowness, straightness and smoothness quantitatively using descriptive statistics (e.g. standard deviation from the least squares line). A check may also be made to determine how parallel the least squares line is with the main diagonal. A parallel line implies the frequency is not changing with time.

A decision is then made to search for another off-diagonal (block 550). If the quality of the diagonal is inadequate or additional diagonals are required, the search continues at block 520. If the quality of the diagonal is adequate and no more diagonals are needed, or if the entire recurrence matrix has been examined, the search ends (block 560). In this manner, the recurrence matrix is searched backward in time for one or more diagonals.

In some embodiments, only the first diagonal needs to be identified and measured. However, in other embodiments, multiple diagonals may be identified and processed. After the first off-diagonal is measured, the recurrence matrix is searched for additional diagonals. Each off-diagonal is mapped out and measured. An assessment is made as to the quality of the mapped off-diagonals such that the most representative is chosen. If the individual quality is poor, then the off-diagonals may be averaged to average out noise and/or other disturbances.

In some embodiments, only the rightmost column is searched for off-diagonals. In other embodiments, individual searches are made using columns out to a reasonable expectation of period (or period determined in previous frames). The first off-diagonal can still be located from multiple columns, whereby the first off-diagonal will be mapped out multiple times, and an average location and shape are determined. Once the first off-diagonal has been identified, a decision is then made to continue.

In some embodiments, an entire recurrence matrix is generated and scanned. In other embodiments, computation requirements can be reduced by computing only a small portion of the recurrence matrix. For instance, the number of columns will be twice the reasonable expectation of period [in seconds] divided by sample time [in seconds]. This could result in a strip of matrix on the far right side. Only the strip is scanned for off-diagonals. These embodiments offer savings in computational requirements.

In some embodiments, the input signal is not correlated with itself. Instead, the input signal is correlated with a second signal.

A method herein is not limited to any particular discrete recursive filter. The recursive filter may be derived using Z-transforms, which can be found via conversion tables from common s-domain filters. Once a Z-transform is identified, it can be converted to a difference equation in the time domain, which is solved for the highest order dependent variable.

Prior to filtering, the input signal may be pre-processed. During pre-processing, the input signal is cleaned up and bounded to stay within a maximum and a minimum.

Figure 6:
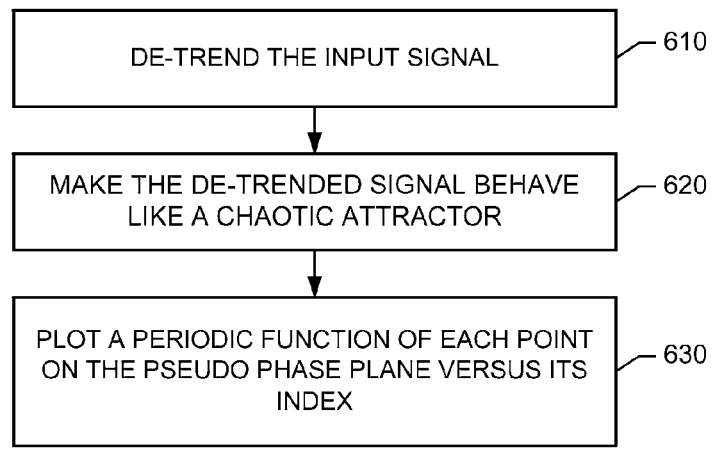
FIG. 6 is an illustration of a method of pre-processing an input signal.
Figure 7:
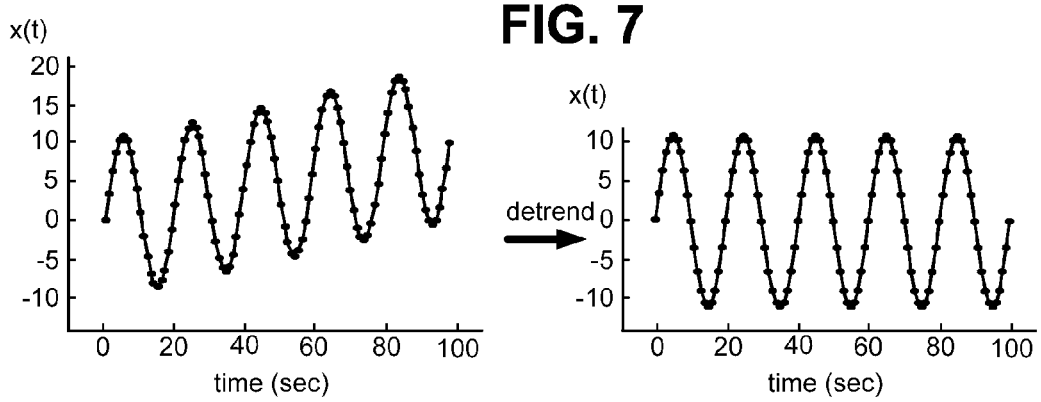
FIG. 7 is an illustration of de-trending a signal.

Reference is now made to FIG. 6, which illustrates a method of pre-processing the input signal. At block 610, the signal is de-trended with zero phase lag. The de-trending may be performed with a high pass recurrence discrete filter with the break frequency less than the lowest operating frequency. A rule of thumb for the high pass break frequency is one-tenth the lowest operating frequency. All frequencies below this are filtered out and the resulting signal is de-trended. As shown in FIG. 7, the de-trending removes ramps and slopes, and causes the de-trended signal to oscillate around zero. The de-trended signal has the desired characteristic of a chaotic attractor in that it is bounded. However, the amplitude of the signal is still free to vary arbitrarily which can degrade recurrence matrix results.

Figure 8:
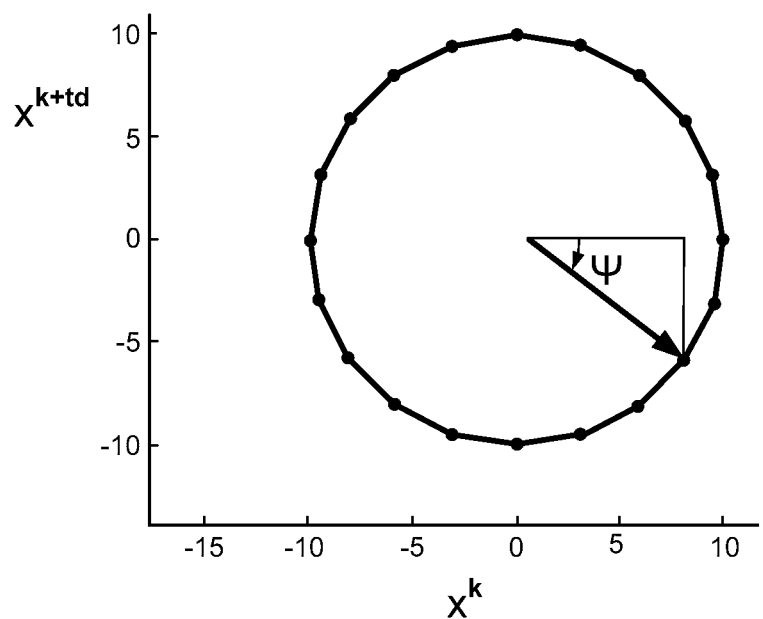
FIG. 8 is an illustration of a plot of the de-trended signal on a pseudo phase plane plot.

At block 620, the de-trended signal is made to behave like a chaotic attractor. For instance, the de-trended signal is plotted on a pseudo phase plot (also known as a state space reconstruction). Using nomenclature borrowed from Chaos theory, the pseudo phase plot uses embedded dimension equal two (i.e., two axes) and the optimum time delay (td) which by rule of thumb is equal to one-quarter of the period of interest. As shown in FIG. 8, the signal has recurring behavior around a zero point, and the plot orbits around the center. As the signal now orbits the origin, a sine function (sin ψ) is created based on every point. (A sine function was chosen out of convenience, but other trigonometric functions may be used) The letter k denotes the signal index. The sine function is a representation of the original signal with signal shape preserved, but the representation is independent of amplitude (importance is placed more on recurring pattern shape than amplitude). Moreover, the sine function is precisely bounded within values of +1 and −1. This step addresses a problem that occurs when the signal has a consistent shape but is growing or shrinking with time. Later when a recurring signal has been identified, its amplitude can be adjusted to match the current signal. This sine function solves the problem of the arbitrary amplitudes. Now all signal points are treated equally and the only parameter that matters is position around the origin.

Figure 9:
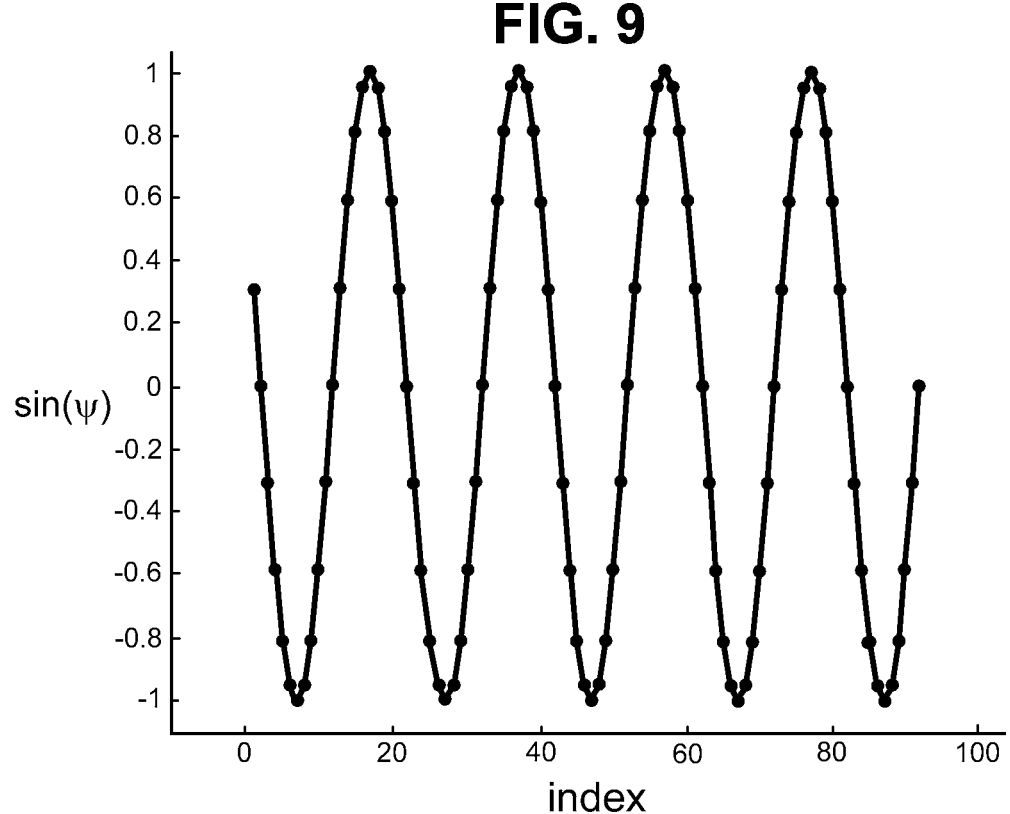
FIG. 9 is a plot of each point on the pseudo phase plane plot versus its index

At block 630, the sine of each point on the pseudo phase plane plot is computed and plotted versus its index. The pre-processed signal is then used to create the recurrence matrix. FIG. 9 depicts what experience has shown: the pre-processed signal is dramatically cleaned up to facilitate the computation of the recurrence matrix.

Pre-processing and filtering herein may be performed on other signals having regular shapes (e.g., sawtooth). Input signals having unusual shapes could be recognized, and pre-processing of such signals could be bypassed. The decision to bypass pre-processing can be made automatically based on whether or not the input signal cooperates in orbiting the pseudo phase plane origin.

A method herein is not limited to a discrete recursive filter.

The type filtering is not limited to any particular type. For instance, a method herein could be used to perform low pass or notch filtering. If low pass filtering is desired, then the zero phase filter results will be added back to the low frequency signal that was extracted during the de-trending process.

Figure 10:
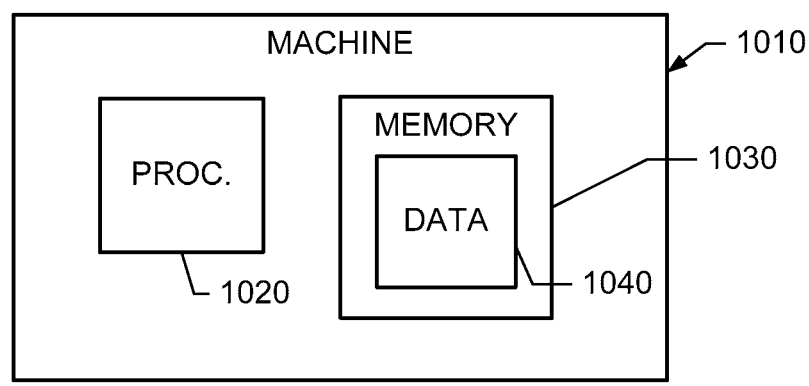
FIG. 10 is an illustration of an apparatus for processing a signal.

Reference is now made to FIG. 10, which illustrates a general hardware implementation of a method herein. A machine 1010 includes a processor 1020 and memory 1030 encoded with data 1040 for causing the processor 1020 to perform a method herein. The machine 1010 could be a computer or a digital signal processor.

Figure 11:
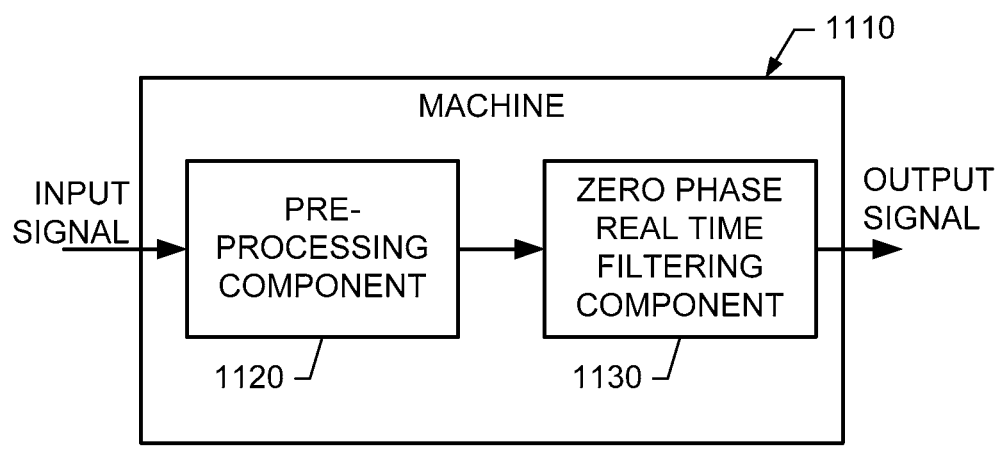
FIG. 11 is an illustration of an apparatus for processing a signal.

Reference is now made to FIG. 11. In some embodiments, the hardware implementation can be characterized as a machine 1110 having a pre-processing component 1120 for performing pre-processing of an input signal, and a component 1130 for performing zero phase real time filtering with a recurrence matrix.

A method and apparatus herein may be used for a variety of applications. The applications include, but are not limited to, flight control systems, lasers, radar & sonar, and communications theory to design and fabricate GPS receivers.

Figure 12:
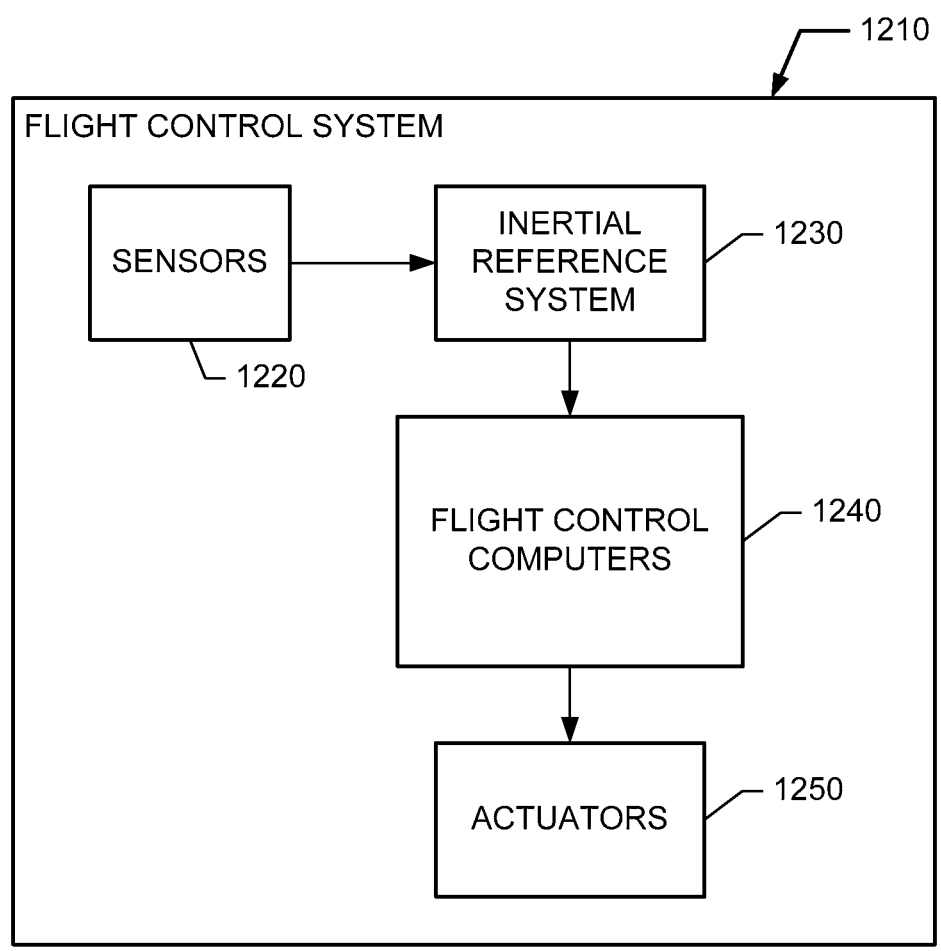
FIG. 12 is an illustration of a flight control system.

Reference is now made to FIG. 12, which illustrates an aircraft flight control system 1210. A plurality of sensors 1220 are used to sense movement changes in the pitch, roll and yaw axes of an aircraft. For example, the signals may include measurements of yaw, pitch and roll. In a large aircraft or high performance aerospace or marine vehicle, however, there are potentially hundreds of signals that could be subject to filtering.

In some embodiments, the sensor signals may be supplied to an inertial reference system 1230, which performs filtering as described herein. The filtered signals are then supplied to flight control computers 1240 with control laws. In other embodiments, the sensor signals may be supplied directly to flight control computers 1240, which perform zero phase real time filtering as described herein.

The flight control computers 1240 determine how to move actuators 1250 at each control surface to provide an ordered response. The flight control computers 1240 generate commands, which are supplied to the actuators 1250 at the control surfaces.

In some instances, the flight control system 1210 will not experience a delay in filtering the sensor signals with zero lag. Sensor data needed to create a recurrence matrix will typically become available for an airplane on the ground before the airplane takes off.

In instances where the sensor data is not available, a pre-computed recurrence matrix may be used to perform zero phase real time filtering. The matrix can be pre-computed from anticipated signal behavior. The precomputed matrix can be used for a short time until enough data is available to compute a recurrence matrix.

In some embodiments, the zero phase real time filtering may be used to measure one or more of many vibrational modes experienced during flight on a large aircraft or helicopter. A low pass filter would remove noise in the sensor signals. The filtering herein would allow a vibrational mode to be filtered in real time with zero phase lag and fed into the flight control system 1210 so that a fast-reacting dampening command can be generated.

A method herein is not limited to filtering. The recurrence matrix can be used for other applications where future signal prediction would be useful.

The invention claimed is:

1. A method of processing a first signal, the method comprising using a processor to:
    identify a past recurring pattern in the first signal with a recurrence matrix;
    attach the recurring pattern to a front of the first signal to produce a second signal; and
    perform zero-phase filtering on the second signal, including applying a filter to the second signal to perform filtering in forward and reverse directions, and combining results of the forward and reverse filtering to produce an output signal in real time with zero phase lag.

2. The method of claim 1, wherein the filter is performing a digital recursive filter.

3. The method of claim 2, wherein the digital recursive filter is a first order lag filter; and wherein the filtering is performed in range around break frequency of the first order lag filter.

4. The method of claim 1, wherein the recurring pattern is attached to the front of the first signal to serve as a future extension of the first signal.

5. The method of claim 1, wherein using the recurrence matrix includes determining indices of a portion of an off-diagonal in the recurrence matrix; and using the indices to identify samples that constitute the recurring pattern in the signal.

6. The method of claim 5, further comprising constructing only a few columns of the recurrence matrix, wherein those few columns are searched for an off-diagonal.

7. The method of claim 5, wherein the samples identified by the indices are copied, and the copied samples are attached to the first signal at time zero, the copied samples measuring length up to one period.

8. The method of claim 1, further comprising using the processor to pre-process the first signal prior to identifying the past recurring pattern, whereby the past recurring pattern is identified in the pre-processed first signal, the pre-processing including:
    de-trending the first signal;
    making the de-trended signal behave like a chaotic attractor; and
    computing a periodic function of each point on a pseudo phase plane plot and plotting each point versus its index.

9. The method of claim 8, wherein the pre-processing is automatically bypassed based on whether or not the first signal cooperates in orbiting the pseudo phase plane's origin.

10. Apparatus comprising a pre-processing component for de-trending an input signal; and a filtering component for generating a recurrence matrix from the de-trended signal, identifying a past recurring pattern using the recurrence matrix, and filtering the de-trended signal and the recurring pattern such that the recurring pattern serves as a future extension of the de-trended signal.

11. The apparatus of claim 10, wherein the recurring pattern is attached to a front of the input signal, and wherein the input signal and the attached pattern are filtered in forward and reverse directions and the results are combined to produce an output signal having zero phase lag in real time.

12. The apparatus of claim 10, wherein the filtering component determines indices of a portion of an off-diagonal in the recurrence matrix; and uses the indices to identify samples that constitute the recurring pattern in the input signal.

13. The apparatus of claim 12, wherein the samples identified by the indices are copied, and the copied samples are attached to the input signal at time zero, the copied samples measuring length up to one period.

14. The apparatus of claim 10, wherein the pre-processing component also makes the de-trended signal behave like a chaotic attractor;
    and computes a representative periodic function.

15. The apparatus of claim 10, further comprising a sensor for generating the input signal; and a flight control computer for generating actuator commands from the filtered signal.

16. A flight control system comprising:
    a flight control computer with control laws;
    sensors configured to capture sensory signals; and
    a filtering module for filtering the sensory signals in real time with zero phase lag, the flight control computer acting upon the filtered sensory signals, wherein the filtering of a sensory signal includes identifying a past recurring pattern in the sensory signal with a recurrence matrix; and filtering the sensory signal and the recurring pattern such that the recurring pattern serves as a representation of future signal behavior.

17. The flight control system of claim 16, wherein the sensory signal and the recurring pattern are filtered in forward and reverse directions, and results of the forward and reverse filtering are combined to produce a filtered signal in real time with zero phase lag.

18. The flight control system of claim 16, wherein the recurring pattern is attached to a front of the sensory signal to serve as a future extension of the sensory signal, and wherein the signal and the recurring pattern are filtered.

19. The flight control system of claim 16, wherein identifying the past recurring pattern includes determining indices of a portion of an off-diagonal in the recurrence matrix; and using the indices to identify samples that constitute the recurring pattern in the input signal.

20. The flight control system of claim 16, further comprising a pre-processing module for pre-processing at least one of the sensory signals prior to identifying the past recurring patterns, wherein the pre-processing module generates a detrended signal characteristic of a bounded chaotic attractor, and generates a periodic function representative of the sensory signal.

21. The flight control system of claim 17, wherein the filtering module includes a first order lag filter for filtering the sensory signal and the recurring pattern in range around break frequency of the first order lag filter.

22. The flight control system of claim 19, wherein only a few columns of the recurrence matrix are constructed, and those few columns are searched for an off-diagonal.

23. The flight control system of claim 19, wherein the samples identified by the indices are copied, and the copied samples are attached to the input signal at time zero, the copied samples measuring length up to one period.

24. The method of claim 20, wherein the periodic function is computed on a pseudo phase plane plot; and wherein the pre-processing module is automatically bypassed based on whether or not the sensory signal cooperates in orbiting the pseudo phase plane's origin.

* * * * *